United States Patent [19]

Opitz

[11] Patent Number: 4,589,885

[45] Date of Patent: May 20, 1986

[54] LIQUID REACTIVE DYESTUFF FORMULATIONS AND THEIR USE

[75] Inventor: Konrad Opitz, Liederbach, Fed. Rep. of Germany

[73] Assignee: Hoechst Aktiengesellschaft, Fed. Rep. of Germany

[21] Appl. No.: 673,860

[22] Filed: Nov. 21, 1984

[30] Foreign Application Priority Data

Nov. 24, 1983 [DE] Fed. Rep. of Germany ....... 3342432

[51] Int. Cl.$^4$ .................... C09B 67/00; C09B 67/24
[52] U.S. Cl. .................... 8/527; 8/549; 8/589
[58] Field of Search .................... 8/527, 549

[56] References Cited

U.S. PATENT DOCUMENTS

| | | | |
|---|---|---|---|
| 4,072,463 | 2/1978 | Schlafer et al. | 8/527 |
| 4,078,884 | 3/1978 | Opitz et al. | 8/527 |
| 4,149,850 | 4/1979 | Schlafer et al. | 8/527 |
| 4,349,349 | 9/1982 | Nakatsuka et al. | 8/527 |
| 4,482,350 | 11/1984 | Tokieda et al. | 8/527 |

Primary Examiner—A. Lionel Clingman
Attorney, Agent, or Firm—Connolly and Hutz

[57] ABSTRACT

Liquid, water-containing dyeing formulation of a reactive dyestuff, which contains 10–50% by weight of C.I. Reactive Blue 19, 5–50% by weight of one or more anionic dispersants from the group of the ligninsulfonates or from the group of condensation products of formaldehyde with naphthalenesulfonic acid or with a naphthalenesulfonic acid which is substituted by 1–3 lower alkyl groups, 1–30% by weight of the sodium salt of anthraquinone-2-sulfonic acid, 1–6% by weight of one or more buffer substances which are incapable of any reaction with the reactive dyestuff which diminishes the dyeing strength, and 38–83% by weight of water.

4 Claims, No Drawings

LIQUID REACTIVE DYESTUFF FORMULATIONS AND THEIR USE

Nitrogen-containing fiber materials, such as wool, silk or nylon fibers, and especially fiber materials consisting of natural or regenerated cellulose and blend fabrics containing these fibers are widely dyed and printed with reactive dyestuffs which are employed in the form of powders containing dry and non-coloring standard dyeing agents. In addition to the fact that the pulverulent form gives rise to unpleasant dust, the chief disadvantages of the dyestuff powders is that it is difficult to make up print pastes and padding and dyeing liquors since, owing to the fact that many of them contain de-dusting agents which contain mineral oil which can appear in oily deposits, many of the dyestuff powders have poor wetting properties, tend to form lumps or are insufficiently soluble.

These disadvantages of dyestuff powders are found to be particularly unpleasant in the case of those dyeing methods where it is of critical importance to obtain high dyestuff concentrations at low temperatures, for instance in short-time pad-batch methods. Here the wish is for liquid dyeing formulations which are clearly superior to the pulverulant ones. Readily water-soluble reactive dyestuffs can be turned, with water as the sole solvent, into liquid dyeing formulations having dyestuff contents or practical interest, as are known, for example, from German Pat. Nos. 2,417,255, 2,454,893 and 2,454,908. However, if the teaching contained therein is applied to C.I. Reactive Blue 19, it is found that, although it is possible to prepare these liquid dyeing formulations, they have considerable application disadvantages which do not arise in the case of the reactive dyestuffs described in said German Patents. These application disadvantages are the totally inadequate alkali stability of the padding and dyeing liquors prepared from these liquid formulations of C.I. Reactive Blue 19. To obtain level dyeings of good dyeing yield, it is necessary for the dyestuff in the dyeing and padding liquors to remain in solution sufficiently long, and not to precipitate, after the required amount of alkali and salts have been added. There are various customary tests for the alkali stability of padding and dyeing liquors, in which, after the addition of NaCl or $Na_2SO_4$ and of alkali, for example in the form of sodium hydroxide solution, sodium carbonate solution, sodium silicate or trisodium phosphate, alone or mixed, drops of the liquor are examined for if and when the dyestuff precipitates. It is a great disadvantage if there are any precipitations of dyestuff, since they are the cause of unlevel or spotty dyeings and also diminish the dyeing yield. Thus, there should ideally be no dyestuff precipitations in the tests in the course of a period which is about as long as a dyeing. The longer the time before the appearance of dyestuff precipitations in the tests, the better thus is a liquid formulation of C.I. Reactive Blue 19. A formulation is most suitable when there is no dyestuff precipitation at all within the stipulated length of time. In the past, then, numerous attempts have been made to overcome these disadvantages of purely aqueous liquid formulations which contain C.I. Reactive Blue 19.

For instance, Japanese Preliminary Published Application 103,250/1981 discloses aqueous dyeing formulations of C.I. Reactive Blue 19 which contain an alkylnaphthalenesulfonic acid/formaldehyde condensation product. It is true that this represents an improvement over a purely aqueous dye formulation; yet the degree of the improved alkali stability is still not high enough to meet the demands of practical dyeing.

If the solubilizers and combinations of solubilizers with anionic dispersants which are described in British Pat. No. 1,060,063 and German Offenlegungsschriften 2,529,658 or 3,126,081 for reactive dyestuffs which are less readily soluble in water alone are applied to C.I. Reactive Blue 19, although they are merely described for obtaining higher dyestuff contents in the liquid dyeing formulation and for improving the shelf-life of such liquid dye formulations, the alkali stability is again found to be improved but still a long way short of meeting the practical requirements. If ε-caprolactam, mentioned in British Pat. No. 1,060,063, is used as a solubilizer, it is found in addition that storage under warm conditions causes a marked loss of dyeing strength. Furthermore, Japanese Preliminary Published Application Sho-58-1,751 discloses liquid dyeing formulations of reactive dyestuffs, including C.I. Reactive Blue 19, which contain nonionic dispersants from the group of α-methylbenzyl-containing oxyalkylates of aromatic hydroxy compounds. The presence of these dispersants improves the shelf-life, especially as regards to undesirable increase in viscosity on storage at low temperatures. However, these added dispersants are no solution to the problem of the poor alkali stability of padding and dyeing liquors containing C.I. Reactive Blue 19.

The alkali stability of padding and dyeing liquors prepared using liquid dyeing formulations containing C.I. Reactive Blue 19 is improved, in particular compared with the liquid dyeing formulations of Japanese Preliminary Published Application 103,250/81, with the liquid dyeing formulations described in European Pat. No. A 0,037,117. These liquid dyeing formulations of C.I. Reactive Blue 19, in addition to a condensation product of formaldehyde with optionally alkyl-substituted naphthalenesulfonic acid, contain 0.1% to 10% of a nonionic dispersant. However, the improved alkali stability of the padding and dyeing liquors prepared therefrom is achieved at the heavy expense of a pronounced tendency to foaming, which appears not only in the case of the liquid dyeing formulation itself but also in the case of the padding and dyeing liquors and the resulting waste waters.

The present invention, then, relates to liquid dyeing formulations containing C.I. Reactive Blue 19 which not only are free of the disadvantages described above but also feature, in addition to a long shelf-life at low and high temperatures without dyestuff precipitations, without loss of dyeing strength and without impairment of fluency, satisfactory alkali stability of the padding and dyeing liquors prepared therefrom. Moreover, neither the liquid dyeing formulations according to the invention nor the padding and dyeing liquors prepared therefrom nor the waste waters resulting therefrom have any tendency to foam.

The liquid dyeing formulations according to the invention contain 10 to 50% by weight of C.I. Reactive Blue 19, 5 to 50% by weight of one or more anionic dispersants from the group of the ligninsulfonates or from the group of the condensation products of formaldehyde with naphthalenesulfonic acid or with a naphthalenesulfonic acid whichis substituted by 1 to 3 lower alkyl groups, 1 to 30% by weight of the sodium salt of anthraquinone-2-sulfonic acid, 1–6% by weight of one or more buffer substances incapable of any reaction with the reactive dyestuff which would reduce the dyeing strength, and 38 to 83% by weight of water.

Moreover, the liquid dyeing formulations according to the invention can additionally contain antifungal and antibacterial preservatives.

It is true that sodium anthraquinone-2-sulfonate is described in German Pat. No. 2,412,964 as one of several components of a pulverulent formulation of C.I. Reactive Blue 19 which have advantageous properties in pad and exhaustion dyeings. However, from the extremely low solubility in water which is given in the literature for sodium anthraquinone-2-sulfonate (0.43% at 20° C.; see Beilstein, Volume 11, Second Supplement, page 194), it was unlikely that the amount of sodium anthraquinone-2-sulfonate required for improving the alkali stability of padding and dyeing liquors could be made to dissolve at all in the very concentrated liquid dyeing formulations. Although the liquid dyeing formulations according to the invention contain significantly more sodium anthraquinone-2-sulfonate than corresponds to the water solubility of this compound (1% of sodium anthraquinone-2-sulfonate in a liquid dyeing formulation containing 83% of water corresponds to a sodium anthraquinone-2-sulfonate content of 1.19% in the amount of water present in the liquid dyeing formulations and thus to almost three times the solubility of sodium anthraquinone-2-sulfonate in pure water (in the other claimed compositions of the liquid formulations the concentration of sodium anthraquinone-2-sulfonate, based on the amount of water contained therein, is still higher)), there are none of the disadvantages which might have been expected, such as precipitation on storage, in particular not even on storage for periods as long as several weeks or at temperatures as low as below 5° C.

Particularly preferred liquid dyeing formulations contain

15–30% by weight of C.I. Reactive Blue 19,

5–30% by weight of a condensation product of formaldehyde and naphthalenesulfonic acid which can be substituted by lower alkyl groups, 2–20% by weight of the sodium salt of anthraquinone-2-sulfonic acid, 1–5% by weight of one or more buffer substance and 40–77% by weight of water.

The liquid dyeing formulations according to the invention are prepared by dissolving C.I. Reactive Blue 19 in water in the presence of one or more anionic dispersants and in the presence of sodium anthraquinone-2-sulfonate, in particular by dissolving C.I. Reactive Blue 19 which is in dry or moist form, for example in the form of a moist filter cake, at room temperature or at an elevated temperature of up to 50° C. with stirring together with one or more anionic dispersants and sodium anthraquinone-2-sulfonate.

The liquid dyeing formulations according to the invention can also be prepared by adding one or more anionic dispersants and sodium anthraquinone-2-sulfonate to the dyestuff solution obained at the end of the dyestuff synthesis and, if desired, to obtain a higher dyestuff content, either distilling off some of the water under reduced pressure or adding, and dissolving, further, solid C.I. Reactive Blue 19 obtained by drying part of the solution obtained in the sythesis.

The liquid C.I. Reactive Blue 19 formulations according to the invention are particularly stable in storage and do not give rise to any precipitation whatsoever even on storage for several weeks either at room temperature or at an elevated temperature of up to 50° C. or even at a temperature of 0° C. Moreover, the reactivity of the dyestuff remains unimpaired, so that there is no loss of dyeing strength. Furthermore, neither the liquid dyeing formulations according to the invention nor the padding and dyeing liquors prepared therefrom nor the waste waters resulting therefrom tend to foam. Owing to these advantages properties, the formulations according to the invention are particularly suitable for dyeing and printing natural polyamide fiber materials, such as wool and silk, and synthetic polyamide fiber materials or fiber materials made of natural or regenerated cellulose, such as cotton, linen, viscose staple and filament viscose, and also fiber blends containing one or more of said types of fiber. The dyeing formulations according to the invention are particularly suitable for preparing padding and dyeing liquors of excellent alkali stability.

The following examples serve to illustrate the invention. The parts and percentages are by weight.

EXAMPLE 1

22.25 parts of a naphthalenesulfonic acid/formaldehyde condensation product, 8 parts of sodium anthraquinone-2-sulfonate and 6 parts of sodium dihydrogenphosphate are added at 45° to 55° C. with stirring to 550 parts of a dyestuff solution obtained on preparing C.I. Reactive Blue 19 in conventional manner and having a solids content of 12.5 percent by weight, which corresponds to 10 percent by weight of pure dyestuff, and are dissolved therein. After a clarifying filtration in the presence of 5 parts of a filter aid the solution is stripped of 186.25 parts of water under reduced pressure in a rotary evaporator. This leaves 400 parts of a liquid dyeing formulation at pH 4.4 which contains 13.75 percent by weight of pure dyestuff and has 25% of the dyeing strength of a commercial C.I. Reactive Blue 19 powder which contains 55 percent by weight of pure dyestuff. This liquid dyeing formulation is distinguished by a very long shelf-life at low or elevated temperatures, for example no dyestuff precipitation or any other sort of precipitation occurring during six weeks of storage at 50° C. or during one week of storage at 0° C. The dyeing strength remains unchanged during storage under said conditions. This is also true of the fluency. Padding or dyeing liquors prepared with this liquid dyeing formulation have a very high alkali stability and as small a tendency to foaming as the liquid dyeing formulation itself has.

EXAMPLE 2

65 parts of the sodium salt of C.I. Reactive Blue 19 having a pure dyestuff content of 77.4% by weight are dissolved in 294 parts of water. After the solution has been warmed to 50° C., 10 parts of sodium anthraquinone-2-sulfonate, 25 parts of a naphthalenesulfonic acid/formaldehyde condensation product, 4 parts of sodium borate and 2 parts of oxalic acid are added and dissolved therein. A clarifying filtration in the presence of 5 parts of a filter aid leaves 400 parts of a liquid dyeing formulation at pH 6 which has the same advantageous properties as are described in Example 1.

EXAMPLE 3

Example 1 is repeated, except that 5 parts of sodium anthraquinone-2-sulfonate and 30 parts of the naphthalenesulfonic acid/formaldehyde condensation product are used and evaporation under reduced pressure is used to reduce the volume of the filtrate to again 400 parts, affording a liquid dyeing formulation having the same advantageous properties as are described in Example 1.

EXAMPLE 4

Example 1 is repeated, except that the naphthalenesulfonic acid/formaldehyde condensation product is replaced by a dimethylnaphthalenesulfonic acid/formaldehyde condensation product, affording a liquid dyeing formulation having the same advantageous properties as are described in Example 1.

EXAMPLE 5

18 parts of sodium ligninsulfonate, 6 parts of sodium anthraquinone-2-sulfonate and 6 parts of sodium dihydrogenphosphate are added at 50° C. with stirring to 550 parts of a dyestuff solution obtained on preparing C.I. Reactive Blue 19 in conventional manner and having a 12.5% by weight solids content, which corresponds to 10% by weight of pure dyestuff, and are dissolved therein. 280 parts of water are then evaporated out of the solution under reduced pressure in a rotary evaporator. This leaves 300 parts of a liquid dyeing formulation at pH 4.2 which contains 18.33% by weight of pure dyestuff and which has one third of the dyeing strength of a commercial C.I. Reactive Blue 19 powder containing 55% by weight of pure dyestuff. This liquid dye formulation has the same advantageous properties as are described in Example 1.

EXAMPLE 6

30 parts of naphthalenesulfonic acid/formaldehyde condensation product, 5 parts of sodium anthraquinone-2-sulfonate, 4 parts of sodium acetate and 2 parts of acetic acid are added at 50° to 55° C. with stirring to 600 parts of a dyestuff solution obtained on preparing C.I. Reactive Blue 19 in conventional manner and having a solids content of 10.5% by weight, which corresponds to a pure dyestuff content of 9.2% by weight, and the mixture is stirred for 30 minutes until everything has dissolved. 239 parts of water are then distilled off under reduced pressure in a rotary evaporator. This leaves 400 parts of a liquid dye formulation at pH 4.6 which contains 13.75% by weight of pure dyestuff and has 25% of the dyeing strength of a commercial C.I. Reactive Blue 19 powder containing 55% by weight of pure dyestuff, and the same advantageous properties are as described in Example 1.

EXAMPLE 7

20 parts of naphthalenesulfonic acid/ formaldehyde condensation product, 5 parts of sodium anthraquinone-2-sulfonate and 3 parts of sodium dihydrogenphosphate are added at 50° to 55° C. with stirring to 600 parts of a dyestuff solution obtained on preparing C.I. Reactive Blue 19 in conventional manner and having a solids content of 10.5% by weight, which corresponds to a pure dyestuff content of 9.2% by weight, and the mixture is stirred for 30 minutes until everything has dissolved. 378 parts of water are then distilled off under reduced pressure in a rotary evaporator. This leaves 250 parts of a liquid dye formulation at pH 4.5 which contains 22% by weight of pure dyestuff and has 40% of the dyeing strength of a commercial C.I. Reactive Blue 19 powder containing 55% by weight of pure dyestuff, and the same advantageous properties as are described in Example 1.

EXAMPLE 8

Example 6 is repeated, except that the naphthalenesulfonic acid/formaldehyde condensation product is replaced by the same amount of an ethylnaphthalenesulfonic acid/formaldehyde condensation product or by a dimethylnaphtalenesulfonic acid/formaldehyde condensation product or by a sodium ligninsulfonate or by a mixture of two or more of these products, affording a liquid dye formulation having the same advantageous properties as are described in Example 1.

I claim:

1. A liquid, water-containing dyeing formulation of a reactive dyestuff, which contains 10–50% by weight of C.I. Reactive Blue 19, 5–50% by weight of one or more anionic dispersants from the group of the ligninsulfonates or from the group of the condensation products of formaldehyde with naphthalenesulfonic acid or with a naphthalenesulfonic acid which is substituted by 1–3 lower alkyl groups, 1–30% by weight of the sodium salt of anthraquinone-2-sulfonic acid, 1–6% by weight of an alkalimetal salt of phosphoric acid or of a mixture of sodium acetate/acetic acid as buffer substances, and 38–83% by weight of water.

2. The liquid, water-containing dyeing formulation of a reactive dyestuff as is claimed in claim 1, wherein the anionic dispersant contained therein is a naphthalenesulfonic acid/formaldehyde condensation product.

3. The liquid, water-containing dyeing formulation of a reactive dyestuff as is claimed in claim 1, wherein the anionic dispersant contained therein is an alkylnaphthalenesulfonic acid/formaldehyde condensation product having alkyl groups of 1 to 4 carbon atoms.

4. The liquid, water-containing dyeing formulation of a reactive dyestuff as is claimed in claim 1, wherein the anionic dispersant is an alkali metal ligninsulfonate.

* * * * *